(12) United States Patent  
Fujii et al.

(10) Patent No.: US 7,367,611 B2
(45) Date of Patent: May 6, 2008

(54) CONSTRUCTION MACHINE

(75) Inventors: Tokuo Fujii, Hiroshima (JP); Hideki Ookubo, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 56 days.

(21) Appl. No.: 11/537,072

(22) Filed: Sep. 29, 2006

(65) Prior Publication Data
US 2007/0108796 A1    May 17, 2007

(30) Foreign Application Priority Data
Nov. 16, 2005  (JP) .............................. 2005-331889

(51) Int. Cl.
*B60J 7/00* (2006.01)
(52) U.S. Cl. ................. 296/190.1; 296/107.07
(58) Field of Classification Search ............ 296/190.1, 296/146.1, 152, 190.01, 201; 49/352, 502, 49/349
See application file for complete search history.

(56) References Cited

U.S. PATENT DOCUMENTS 4,357,781 A * 11/1982 Ohya et al. ................... 49/227
4,986,593 A * 1/1991 Lohmann .................. 296/190.1
5,826,440 A * 10/1998 Okada et al. ................... 62/239
6,857,685 B2 * 2/2005 Wagner .................. 296/107.07
6,938,943 B2 * 9/2005 Obendiek et al. ...... 296/107.07
7,044,534 B2 * 5/2006 Ishibashi et al. ......... 296/190.1

FOREIGN PATENT DOCUMENTS

JP         4-62775       5/1992
JP      2002-88810       3/2002

* cited by examiner

*Primary Examiner*—Kiran B. Patel
(74) *Attorney, Agent, or Firm*—Oblon, Spivak, McClelland, Maier & Neustadt, P.C.

(57) ABSTRACT

An upper end of a link is attached to a roller shaft of an upper guide roller provided in an upper part of a front window for opening and closing a front opening of a cabin. A lower end of the link is provided with a wire retaining pin that moves in a wire guide rail. One end of an assist wire connected to a spring at the other end is connected to the wire retaining pin. Thus, in a window-closed state, tension acts on the front window as a pressing force for pressing the front window forward, and when the front window is to be opened, the tension acts through the link on the front window as an assisting force.

4 Claims, 3 Drawing Sheets

CONSTRUCTION MACHINE

BACKGROUND OF THE INVENTION

1. Field of the Invention

The present invention relates to a construction machine, such as a hydraulic excavator, with a front-window opening/closing device for opening and closing a front window of a cabin.

2. Description of the Related Art

As an exemplary front-window opening/closing device of this type, a front-window opening/closing device of a slide type, such as that disclosed in Japanese Unexamined Utility Model Registration Application Publication No. 4-62775, for opening and closing a front opening of a cabin is known.

FIG. 6 illustrates a known front-window opening/closing device of a slide type. This device has an assisting mechanism for assisting the opening and closing of a front window 1. Specifically, one end of a wire 9 is connected to a spring 8 at the rear of a cabin 4 and the other end of the wire 9 is connected to the front window 1, and thus the force of the spring 8 pulls the front window 1 rearward.

However, the front-window opening/closing device with such an assisting mechanism has some problems. For example, since the wire 9 is connected to a lower end of the front window 1 (i.e., connected to a roller shaft 3a of a lower guide roller 3) and the tension of the wire 9 is applied to the lower end of the front window 1, an end of the wire 9 is connected to the lower end of the front window 1 in a manner to extend between a wire guide rail 10 and a roller guide rail 5. This increases frictional resistance between this end of the wire 9 and each guide rail (particularly the roller guide rail 5).

Since, in particular, a front rail 6 has a curved part with a recessed portion 6b at the bottom, frictional resistance in this part increases at an early stage of the opening operation of the front window 1.

Therefore, frictional resistance increased when the front window 1 is opened and closed affects the original assisting function of the assisting mechanism and interferes with smooth operation.

To prevent this problem, an end of the wire 9 may be connected to an upper end of the front window 1. This achieves lower frictional resistance than in the case where it is connected to a lower end of the front window 1. However, in a window-closed state in which the front window 1 is closed, the tension of the wire 9 is directly applied rearward to the upper end of the front window 1. This leads to a reduced pressing force of the front window 1 against the front opening of the cabin 4, and thus degrades sealing performance.

SUMMARY OF THE INVENTION

Accordingly, an object of the present invention is to provide a construction machine with a front-window opening/closing device that can ensure sealing performance in a window-closed state while effectively performing the original assisting function of an assisting mechanism.

A construction machine of the present invention has the following basic configuration.

That is, according to an aspect of the present invention, a construction machine includes a cabin, a front window for closing a front opening of the cabin, and a front-window opening/closing device for opening and closing the front window between a closed position of the front window and an opened position along a ceiling of the cabin. The front-window opening/closing device includes an upper guide roller provided in an upper part of the front window, a lower guide roller provided in a lower part of the front window, a roller guide rail disposed in the cabin and guiding the upper guide roller and lower guide roller, a wire guide rail disposed in the cabin and along the roller guide rail, and an assisting mechanism. In the assisting mechanism, the upper guide roller, the lower guide roller, and the roller guide rail allow the front window to move between the closed position and the opened position, while tension of an assist wire moving in the wire guide rail pulls the front window toward the opened position. Moreover, a link is provided in the upper part of the front window such that:

(A) an upper end of the link is connected to the front window so as to allow the link to pivot about a substantially horizontal link shaft in a horizontal direction of the front window;

(B) a lower end of the link is movable in the wire guide rail; and (C) the link is raised when the front window is closed, while the assist wire is connected to the lower end of the link in the wire guide rail and, when the front window is closed, a straight line connecting a center of the link shaft with a connecting point at which the assist wire is connected to the lower end of the link is tilted forward from an action line of tension applied by the assist wire to the lower end of the link.

In this case, in the window-closed state, the tension of the assist wire acts on the link as a pivoting force in a forward tilting direction which allows the link to pivot about the lower end thereof. This pivoting force of the link presses the upper end of the front window forward.

In other words, the tension for assisting the opening operation of the front window can act, in the window-closed state, as a pressing force for pressing the front window against the cabin (a seal at the front opening).

Moreover, since the lower end of the link connected to the assist wire moves in the wire guide rail, no frictional resistance to opening the front window is generated between the assist wire and the wire guide rail.

Thus, sealing performance in the window-closed state can be ensured while the original assisting function of the assisting mechanism can be effectively performed.

DESCRIPTION OF THE PREFERRED EMBODIMENTS

An exemplary configuration of a front-window opening/closing device to which the present invention is applicable will now be described.

Figure 1:
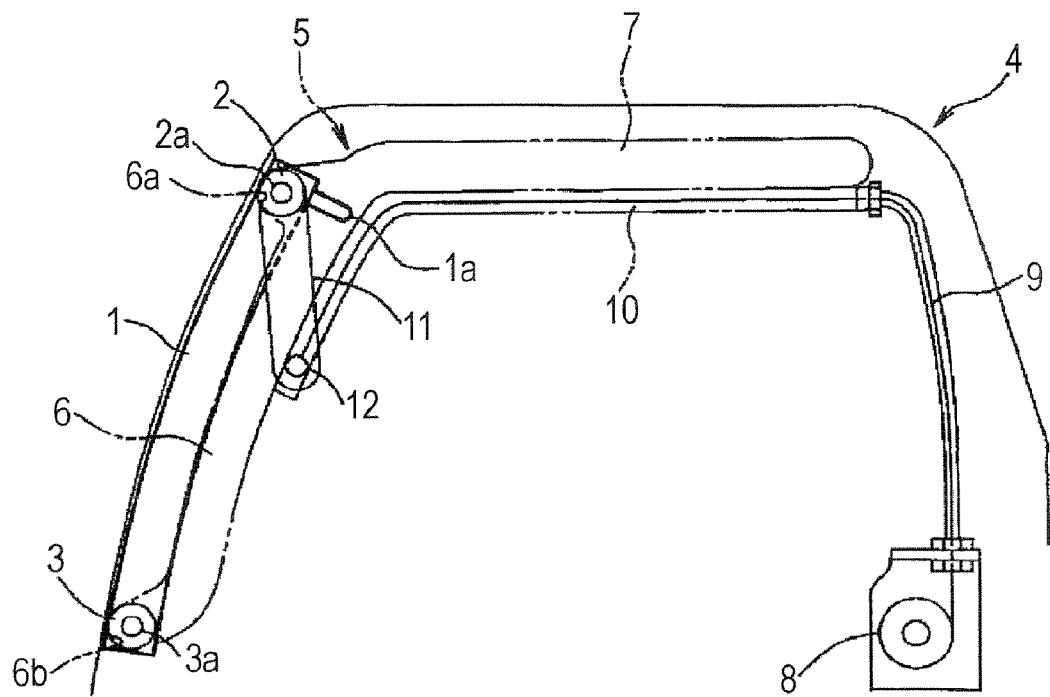
FIG. 1 is a side view illustrating a front-window opening/closing device of a construction machine according to an embodiment of the present invention.
Figure 2:
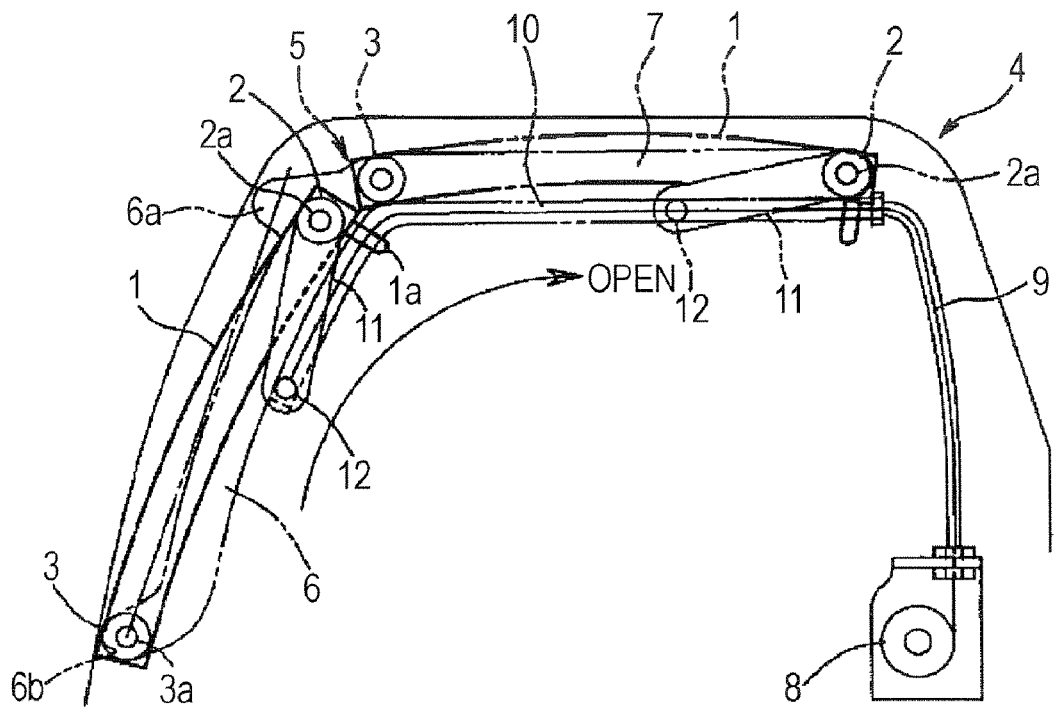
FIG. 2 is a side view illustrating a process in which a front window is opened from the state illustrated in FIG. 1.

Referring to FIG. 1 and FIG. 2, the upper and lower sides (which refer to a vertical positional relationship in the window-closed state illustrated in FIG. 1, and the same applies to the following description) of a front window 1 are provided with a pair of left and right guide rollers (upper guide rollers 2) and a pair of left and right guide rollers (lower guide rollers 3), respectively. FIG. 1 and FIG. 2 illustrate the upper and lower guide rollers 2 and 3 on one of the left and right sides of the front window 1 only. Walls on both the left and right sides of a cabin 4 are provided with respective roller guide rails 5 while only one of the roller guide rails 5 is illustrated. The roller guide rail 5 guides the guide rollers 2 and 3 from the front along a ceiling toward the rear. The guide rollers 2 and 3 and the roller guide rail 5 allow the front window 1 to slide between a closed position at which a front opening of the cabin 4 is closed as illustrated in FIG. 1 and an opened position along the ceiling of the cabin 4 as illustrated in FIG. 2.

A handle 1a is provided for opening and closing the front window 1. A locking device (not shown) locks the front window 1 at both the closed and opened positions.

The roller guide rail 5 includes a front rail 6 for guiding the guide rollers 2 and 3 on the closing side of the front window 1, and a rear rail 7 for guiding the guide rollers 2 and 3 on the opening side of the front window 1.

The front rail 6 is provided with recessed portions 6a and 6b on the upper and lower sides, respectively. The recessed portions 6a and 6b are recessed from the front. When the front window 1 is being closed, the guide rollers 2 and 3 are brought into engagement with the recessed portions 6a and 6b, respectively. This allows the front window 1 to be moved forward and pressed against a seal (not shown) along an opening edge of the cabin 4.

The front-window opening/closing device, particularly for a large construction machine, incorporates an assisting mechanism (assisting means) for smooth opening and closing of the heavy front window 1. Specifically, an end of an assist wire 9 is connected to a spring (balancer spring) 8 at the rear of the cabin 4 and the other end of the assist wire 9 is connected to the front window 1, such that a spring force acting as tension pulls the front window 1 rearward, that is, toward the opened position.

In this assisting mechanism, a wire guide rail 10 for guiding the assist wire 9 is provided along the roller guide rail 5.

The assisting mechanism is configured such that the assist wire 9 is connected to a lower end of the front window 1 (i.e., connected to a roller shaft 3a of the lower guide roller 3) and tension of the assist wire 9 is applied to the lower end of the front window 1.

Embodiments of the present invention based on the above-described basic configuration will be described with reference to FIG. 1 through FIG. 5.

FIG. 1 illustrates a closed state of the front window 1. In FIG. 2, the front window 1 in the state illustrated in FIG. 1 is temporarily tilted rearward (as indicated by a solid line) and then slid rearward and opened (as indicated by a chain double-dashed line).

Figure 3:
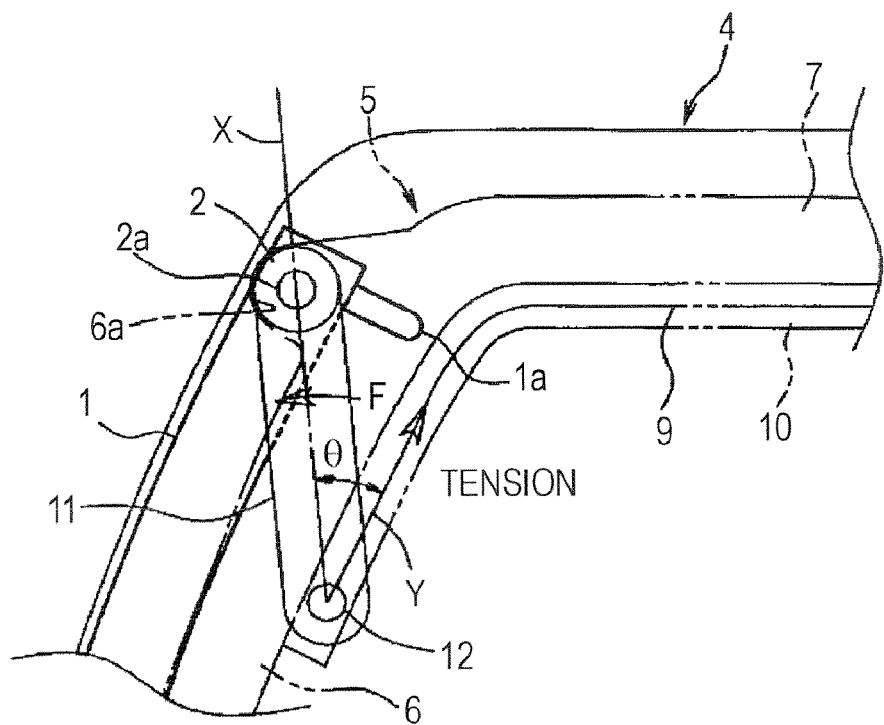
FIG. 3 is an enlarged view of an upper portion of the front window in the state illustrated in FIG. 1.
Figure 4:
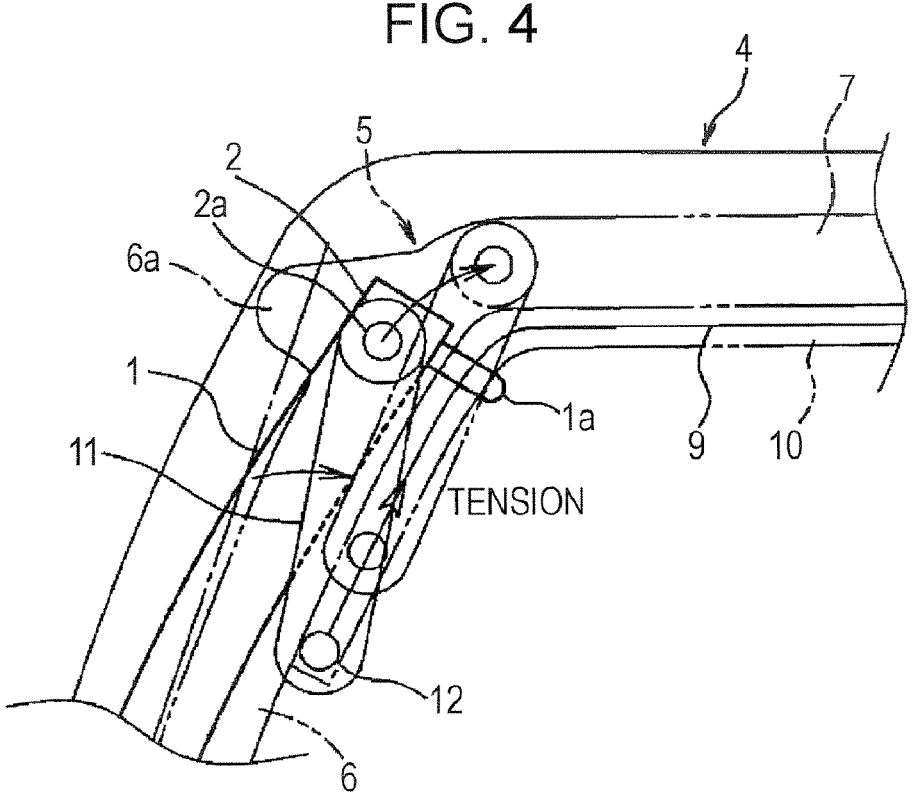
FIG. 4 is an enlarged view of the upper portion of the front window at the position indicated by a solid line in FIG. 2.
Figure 5:
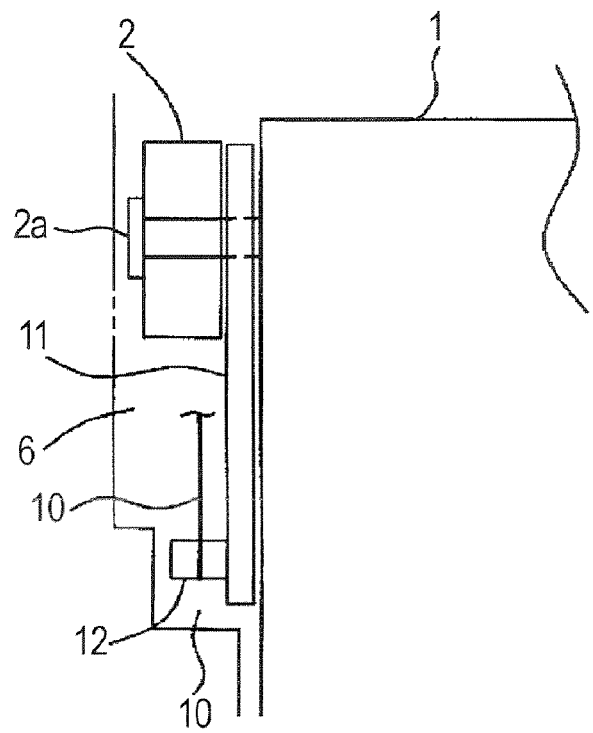
FIG. 5 is a partial front view of FIG. 4.

FIG. 3 is an enlarged view of an upper portion of the front window 1 in the state illustrated in FIG. 1. FIG. 4 is an enlarged view of the upper portion of the front window 1 at the position indicated by the solid line in FIG. 2.

In this front-window opening/closing device, a link 11 is provided in an upper part of each side of the front window 1. The link 11 is provided such that:

(A) an upper end of the link 11 is connected to the front window 1 so as to allow the link 11 to pivot about a horizontal shaft in a horizontal direction of the front window 1;

(B) a lower end of the link 11 is movable in the wire guide rail 10; and (C) the link 11 is raised when the front window 1 is closed as illustrated in FIG. 1 and FIG. 3. Specifically:

(I) the upper end of the link 11 is attached to a roller shaft 2a such that the link 11 is pivotable about the roller shaft 2a, which serves as a rotational shaft of the upper guide roller 2 and as a horizontal shaft in the horizontal direction of the front window 1;

(II) a wire retaining pin 12 is attached to the lower end of the link 11 so as to be in parallel with the roller shaft 2a;

(III) the wire retaining pin 12 is engaged with the wire guide rail 10 so as to be movable in the wire guide rail 10; and (IV) an end of the assist wire 9 is connected to the wire retaining pin 12.

The dimensions and positioning of components involved are determined such that, in the window-closed state illustrated in FIG. 3, a straight line X is tilted forward from an action line Y of tension applied by the assist wire 9 to the lower end of the link 11. The straight line X connects the center of the roller shaft 2a with a connecting point (i.e., the center of the wire retaining pin 12) at which the assist wire 9 is connected to the lower end of the link 11. In FIG. 3, θ represents an angle formed by the straight line X and the action line Y.

In the present embodiment, the link 11 is configured to be slightly tilted forward in the window-closed state.

With this configuration, when the front window 1 is closed as illustrated in FIG. 1 and FIG. 3, tension applied to the assist wire 9 by the spring 8, which is an exemplary tension-generating means, acts through the link 11 on the front window 1 as a pressing force F for pressing the front window 1 forward.

Since this presses the front window 1 against the front opening (i.e., the seal not shown) of the cabin 4, sealing performance in the window-closed state can be ensured.

On the other hand, to open the front window 1, first the locking device (not shown) is released. Next, the handle 1a is used to temporarily tilt the front window 1 rearward as in FIG. 2 and FIG. 4 such that the upper guide roller 2 is moved from the recessed portion 6a in the front rail 6 to the main line of the front rail 6. Then, the front window 1 is slid rearward while being raised.

At this point, the tension of the assist wire 9 acts on the link 11 diagonally backward and upward along the wire guide rail 10, and is applied to the front window 1 as a force directed toward the opened position of the front window 1.

During the closing operation of the front window 1, the tension of the assist wire 9 also acts as a braking force to the front rail 6 when it is being lowered.

Figure 6:
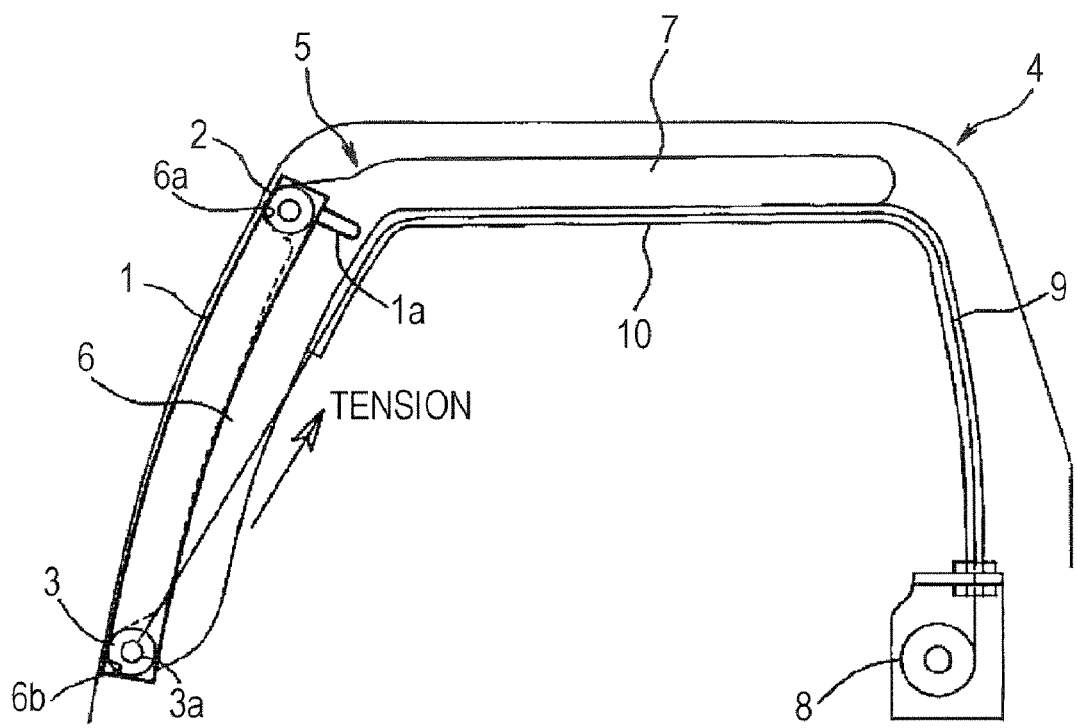
FIG. 6 is a side view of a front-window opening/closing device according to the related art.

In this case, the lower end of the link 11 (or the wire retaining pin 12) is connected to the assist wire 9 in the wire guide rail 10. During the opening operation of the front window 1, the lower end of the link 11 is moved in the wire guide rail 10. Therefore, unlike the front-window opening/closing device illustrated in FIG. 6 where an end of the assist wire 9 is connected to the lower end of the front window 1 in a manner to extend between the wire guide rail 10 and the roller guide rail 5, excessive frictional resistance is not generated between the assist wire 9 and the guide rollers 2 and 3, and between the assist wire 9 and the guide rails 5 and 10.

Therefore, the original assisting function of the assisting mechanism can be effectively performed and allows the front window 1 to be smoothly opened and closed with less effort.

Additionally, the upper end of the link 11 is connected to the roller shaft 2a, which serves as a link shaft. Therefore, the pivoting force of the link 11 in the window-closed state can be applied as a forward pressing force to the front window 1 more efficiently than in the case where, for example, the upper end of the link 11 is attached through the link shaft to the front window 1 at a position below the upper guide roller 2.

Moreover, since the roller shaft 2a also serves as the link shaft, an attaching mechanism of the link 11 can be simplified, and easy and low cost installation can be achieved.

In addition, an end of the assist wire 9 is connected to the wire retaining pin 12 serving as a moving member that moves in the wire guide rail 10. In other words, the wire retaining pin 12 serves both as a moving member and a connecting part for connection with the assist wire 9. This allows achieving a simpler structure than in the case where a wire connecting part and a moving member are separately provided.

It is necessary for the link 11, in the window-closed state, to allow the tension of the assist wire 9 to act as a pressing force on the front window 1 for pressing the front window 1 forward. It is also necessary for the link 11, in the window-opened state, to allow the tension of the assist wire 9 to act as a raising force on the front window 1 for raising the front window 1 backward.

Therefore, the angle θ between the straight line X and the action line Y in the window-closed state is defined such that the above-described two actions can be performed efficiently.

The link 11, the assist wire 9 and the spring 8 may either be provided symmetrically on both the left and right sides of the front window 1 or on only one side of the front window 1. As described above, the front-window opening/closing device allows efficient transmission of an assisting force to the front window 1. Therefore, even if they are provided on only one side, a necessary assisting function can be sufficiently achieved.

Other Embodiments

In the embodiment described above, the roller shaft 2a of the upper guide roller 2 serves also as a link shaft, and the upper end of the link 11 is attached to the roller shaft 2a. However, the upper end of the link 11 may be attached to the front window 1 through a link shaft that is not the roller shaft 2a.

In the embodiment described above, the link 11 is configured to be slightly tilted forward in the window-closed state. However, as long as the straight line X in FIG. 3 is tilted forward with respect to the action line Y, the link 11 may either be configured to stand vertically or to be tilted rearward.

Although the invention has been described with reference to the preferred embodiments in the attached figures, it is noted that equivalents may be employed and substitutions made herein without departing from the scope of the invention as recited in the claims.

What is claimed is:

1. A construction machine comprising:
a cabin;
a front window for closing a front opening of the cabin; and
a front-window opening/closing device for opening and closing the front window between a closed position of the front window and an opened position along a ceiling of the cabin,
wherein the front-window opening/closing device comprises:
an upper guide roller provided in an upper part of the front window;
a lower guide roller provided in a lower part of the front window;
a roller guide rail disposed in the cabin and guiding the upper guide roller and lower guide roller;
a wire guide rail disposed in the cabin and along the roller guide rail; and
assisting means in which the upper guide roller, the lower guide roller, and the roller guide rail allow the front window to move between the closed position and the opened position, while tension of an assist wire moving in the wire guide rail pulls the front window toward the opened position,
and wherein a link is provided in the upper part of the front window such that:
(A) an upper end of the link is connected to the front window so as to allow the link to pivot about a substantially horizontal link shaft in a horizontal direction of the front window;
(B) a lower end of the link is movable in the wire guide rail; and
(C) the link is raised when the front window is closed, while the assist wire is connected to the lower end of the link in the wire guide rail and, when the front window is closed, a straight line connecting a center of the link shaft with a connecting point at which the assist wire is connected to the lower end of the link is tilted forward from an action line of tension applied by the assist wire to the lower end of the link.

2. The construction machine according to claim 1, wherein the tension is given by a spring provided in the assisting means.

3. The construction machine according to claim 1, wherein the upper end of the link is connected to the upper part of the front window such that the link is pivotable about a roller shaft of the upper guide roller, the roller shaft serving as the link shaft.

4. The construction machine according to claim 1, further comprising a wire retaining pin to which an end of the assist wire is connected, the wire retaining pin being provided at the lower end of the link and moving in the wire guide rail.

* * * * *